Patented Mar. 16, 1926.

1,576,737

UNITED STATES PATENT OFFICE.

LESLIE E. FROST, OF PITTSBURGH, PENNSYLVANIA, ASSIGNOR TO WESTINGHOUSE ELECTRIC & MANUFACTURING COMPANY, A CORPORATION OF PENNSYLVANIA.

RESINOUS CEMENT.

No Drawing.  Application filed June 15, 1921.  Serial No. 477,702.

*To all whom it may concern:*

Be it known that I, LESLIE E. FROST, a citizen of the United States, and a resident of Pittsburgh, in the county of Allegheny and State of Pennsylvania, have invented a new and useful Improvement in Resinous Cement, of which the following is a specification.

This invention relates to cements, more especially to a resinous cement having high insulating properties.

Hitherto, cements for use in insulating apparatus have been made with a solution of a phenolic or similar condensation product formed into a paste with an inert filler, such as silica. The cement so formed was applied to the article and hardened by the application of heat. Such cements were found to be unreliable in that the electrical resistance thereof was not uniform. The cement frequently broke down even under low voltage.

I have discovered that the liquid ingredients used in making such a cement are the cause of the unreliability of the material under electrical strain. The condensation product formerly used in the cement was dissolved in alcohol and another solvent, usually benzol. The alcohol utilized always contains more or less water and I have found that the unreliability of the product was almost entirely due to the water content thereof.

My invention is designed to obviate the difficulty experienced with cements of the above-designated character, it being among the objects thereof to provide a cement which shall be entirely free from alcohol or other solvent of the same type and which shall be inexpensive, reliable and easy to manufacture.

In practising my invention, I provide a varnish which is formed by dissolving a gum resin, such as manila gum, in a suitable solvent, such as anhydrous benzol. A solid phenolic condensation product, commonly known as powdered Bakelite "A" is mixed with powdered silica or similar inert filling material. The liquid varnish and the dry mixture are then mixed into a heavy paste which may be applied to the parts being cemented in the same manner as the insulating cements of the prior art. The cement is then hardened and rendered permanently infusible by the application of heat.

It will be seen that my new cement does not contain any substantial amount of water or of substances which tend to absorb water from the atmosphere. I have found by exhaustive tests that cements of this composition are far superior electrically to the ordinary cements and are more uniform in quality and characteristics.

Although I have described my invention by setting forth a specific embodiment thereof, it is obvious that my invention is not limited to such embodiment but I include therein various equivalents of the materials and the steps of process set forth. For instance, the manila gum resin may be replaced by similar resins, such as shellac, copal and the like, the powdered Bakelite "A" by an equivalent binder of the same type, and the silica by various other well known inert filling materials. Although I prefer to mix the several ingredients in the order stated, it will be apparent to those skilled in the art that the steps of the process may be interchanged without materially departing from the spirit of my invention.

I claim as my invention:

1. A cement comprising manila gum dissolved in benzol, a solid phenolic condensation product and an inert filling material.

2. A cement comprising a gum resin dissolved in a water-free benzol, a solid phenolic condensation product and an inert filling material.

3. A cement comprising a gum resin dissolved in benzol, a phenolic condensation product and silica.

4. A cement comprising a gum resin dissolved in benzol, a solid phenolic condensation product and inert filling material.

5. A cement comprising a gum resin dissolved in benzol, a solid phenolic condensation product and silica.

In testimony whereof, I have hereunto subscribed my name this 8th day of June 1921.

LESLIE E. FROST.